United States Patent [19]

Yoshimura

[11] Patent Number: 5,315,283
[45] Date of Patent: May 24, 1994

[54] STRUCTURE FOR VARIABLE ELECTRONIC COMPONENT

[75] Inventor: Tamotsu Yoshimura, Kyoto, Japan

[73] Assignee: Rohm Co., Ltd., Kyoto, Japan

[21] Appl. No.: 76,747

[22] Filed: Jun. 15, 1993

[30] Foreign Application Priority Data

Jun. 24, 1992 [JP] Japan ................... 4-43826[U]

[51] Int. Cl.⁵ ............... H01C 10/30; H01C 10/48
[52] U.S. Cl. ................. 338/162; 338/163; 338/190
[58] Field of Search ............... 338/162, 190, 163, 164, 338/191, 192, 193

[56] References Cited

U.S. PATENT DOCUMENTS

| Re. 33,627 | 7/1991 | Nishizawa et al. | 338/162 |
| 4,712,084 | 12/1987 | Okazaki et al. | 338/163 X |
| 4,785,278 | 11/1988 | Nishizawa et al. | 338/162 |

FOREIGN PATENT DOCUMENTS 2-92903 7/1990 Japan .
3-85604 8/1991 Japan .

Primary Examiner—Marvin M. Lateef
Attorney, Agent, or Firm—William H. Eilberg

[57] ABSTRACT

A variable electronic component includes an insulating substrate, and a rotor made of a metal plate and rotatably supported on the substrate for parameter adjustment of the electronic component. The rotor includes a main rotor member and an upper plate member integral with the main rotor member via a connecting web which is bent so that the upper plate member overlaps on the main rotor member. The upper plate member has an engaging opening for engagement with a turning tool. The main rotor member is provided with a first engaging portion at a position spaced from the connecting web, whereas the upper plate member is provided with a second engaging portion for engagement with the first engaging portion to prevent the upper plate member from angularly deviating relative to the main rotor member when the upper plate member is overlapped on the main rotor member.

5 Claims, 4 Drawing Sheets

STRUCTURE FOR VARIABLE ELECTRONIC COMPONENT

BACKGROUND OF THE INVENTION

1. Field of the Invention

This invention relates to a structure for a variable electronic component, such as variable resistor or variable capacitor, wherein a certain parameter or physical property of the component is adjusted by rotating a rotor relative to a substrate.

2. Description of the Prior Art

A variable resistor of the above-described type is disclosed for example in Japanese Utility Model Application Laid-open No. 2-92903 (Laid-open: Jul. 24, 1990; Inventors: Tamotsu YOSHIMURA et al.; Applicant: Rohm Co., Ltd.). The resistor comprises an insulating substrate formed with a resistor strip, and a metallic rotor member rotatably supported on the substrate. The rotor member has a relatively large central cup recess and an annular flange surrounding the central recess. The annular flange is formed with engaging grooves for engagement with a driver used for turning the rotor member. A part of the annular flange is downwardly deformed to work as a contact portion which comes into pressing and sliding contact with the resistor strip, so that the resistance of the resistor is adjustable by turning the rotor member relative to the substrate.

For automatic assembly of the prior art variable resistor, the rotor member is picked up by a vacuum collet for transfer to the substrate. However, since the flatness of the rotor member is very low due to the presence of the central cup recess, engaging grooves and downwardly deformed contact portion, a large degree of vacuum is required for stably holding the rotor member. Otherwise, the vacuum collet holds the rotor member in an inclined posture, thus frequently failing to properly assemble the resistor.

In view of the above problem, Japanese Utility Model Application Laid-open No. 3-85604 (Laid-open: Aug. 29, 1993; Inventor: Tamotsu YOSHIMURA; Applicant: Rohm Co., Ltd.) proposes the use, in a variable resistor, of a metallic rotor which comprises a cup-form main rotor member and a flat upper plate member integral with the main rotor member via a connecting web which is bent so that the upper plate member overlaps on the main rotor member. The upper plate member has an engaging opening for engagement with a driver. Obviously, the flatness of the upper plate member enables a vacuum collet to hold the rotor reliably at the time of assembling the resistor.

However, the prior art variable resistor described above gives rise to a new problem, as described below.

At the time of performing a parameter adjustment, the rotational force of the driver is first applied to the upper plate member and then transmitted to the main rotor member via the connecting web. However, the friction between the main rotor member and the insulating substrate provides a resistance against rotation of the main rotor member relative to the substrate. Such a frictional resistance causes the connecting web to be elastically deformed at the time of turning the driver (namely, the upper plate member), and the thus deformed connecting web in turn causes the main rotor member to rotate with a slight delay relative to the upper plate member. Further, even after stopping the turning of the driver, the main rotor member still continues to rotate due to the elastic restoration of the deformed connecting web. As a result, it is very difficult to provide a stable and accurate parameter adjustment.

It is conceivable to solve the above problem by increasing the width of the connecting web and/or the thickness of the material metal plate for the rotor, thereby strengthening the connecting web. However, an increase of the width of the connecting web makes it difficult to bend the material metal plate at the connecting web, consequently resulting in a reduction of the productivity (namely, an increase of the production cost). Further, an increase of the thickness of the material metal plate also makes it difficult to press and bend the material metal plate in addition to increasing the material cost.

SUMMARY OF THE INVENTION

It is, therefore, an object of the present invention to provide a variable electronic component, such as variable resistor or variable capacitor, wherein a rotor comprises a main rotor member and an upper plate member integral with the main rotor member via a connecting web which is bent so that the upper plate member overlaps on the main rotor member, and wherein the upper plate member is prevented from angularly deviating relative to the main rotor member, thereby providing a stable and accurate parameter adjustment.

Another object of the present invention is to provide a variable electronic component which is capable of achieving the above-described object while minimizing the provision of additional parts.

According to the present invention, there is provided a variable electronic component comprising: an insulating substrate; and a rotor made of a metal plate and rotatably supported on the substrate for parameter adjustment of the electronic component, the rotor including a main rotor member and an upper plate member integral with the main rotor member via a connecting web which is bent so that the upper plate member overlaps on the main rotor member, the upper plate member having an engaging opening for engagement with a turning tool; wherein the main rotor member is provided with a first engaging portion at a position spaced from the connecting web, the upper plate member being provided with a second engaging portion for engagement with the first engaging portion to prevent the upper plate member from angularly deviating relative to the main rotor member when the upper plate member is overlapped on the main rotor member.

With the arrangement described above, the upper plate member is rotationally fixed to the main rotor member not only by the connecting web but also by the engagement between the first and second engaging portions. Thus, without any need to increase the width of the connecting web and/or the thickness of the material metal plate for the rotor, it is possible to effectively prevent an angular deviation of the upper plate member relative to the main rotor member even if the rotational force of the turning tool is applied only to the upper plate member, thereby enabling a stable and accurate parameter adjustment.

On the other hand, the flatness of the upper plate member enables a vacuum collet to stably hold the rotor with a relatively small such force. Thus, the rotor or variable electronic component according to the present invention also enjoys the advantages obtainable by the provision of the upper plate member.

Preferably, the main rotor member is generally circular, and the first and second engaging portions are located diametrically opposite to the connecting web between the main rotor member and the upper plate member. It is additionally advantageous if the electric component further comprises a lower ring-form slide member integral with the upper plate member via a second connecting web which is bent so that the slide member is located under the main rotor member.

According to one preferred embodiment, the first engaging portion comprises an engaging projection formed on the main rotor member, whereas the second engaging portion comprises an engaging slot formed in the second connecting web for snugly receiving the engaging projection.

According to another embodiment of the present invention, the first engaging portion comprises a pair of engaging projections formed on the main rotor member, whereas the second engaging portion is provided by the second connecting web which snugly fits between the pair of engaging projections.

Other objects, features and advantages of the present invention will be fully understood from the following detailed description given with reference to the accompanying drawings.

DETAILED DESCRIPTION OF THE PREFERRED EMBODIMENTS

Figure 1:
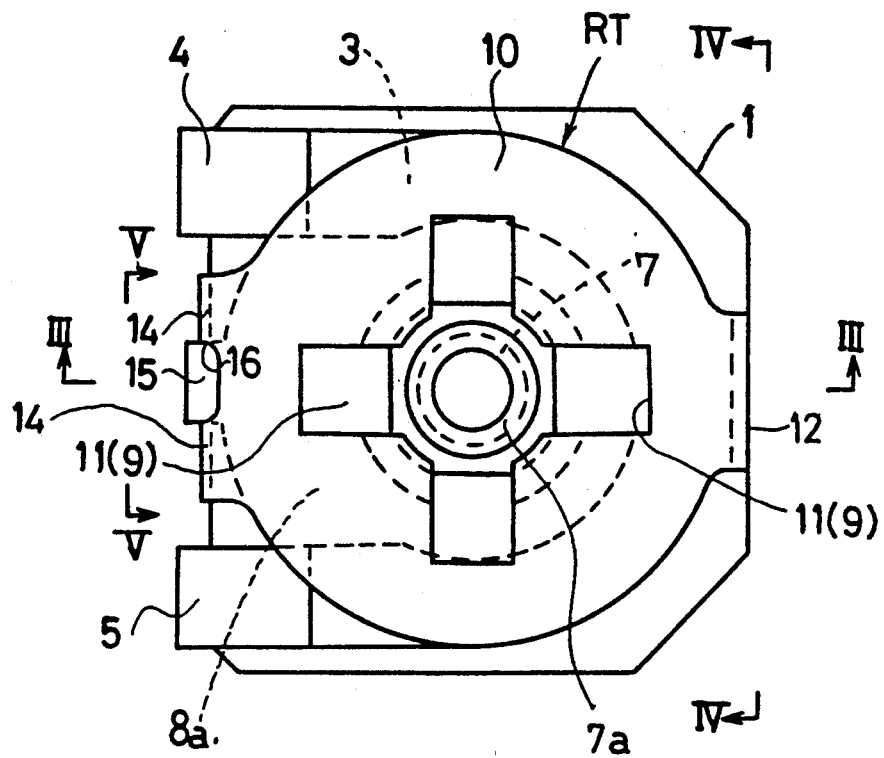
FIG. 1 is a plan view showing a variable resistor according to the invention.

FIGS. 1 through 7 illustrate a first embodiment of the present invention as applied to a variable resistor. However, the present invention may be also applied to a variable capacitor or any other electronic component which requires adjustment of a certain parameter by rotation of a rotor.

The variable resistor according to the first embodiment comprises an insulating substrate 1 made of a ceramic material for example. The substrate 1 has a central bore 2 (see FIG. 3), and carries a generally U-shaped resistor strip 3 formed by coating on the upper surface of the substrate to partially surround the central bore 2 (see FIGS. 1, 3 and 4). The respective ends of the resistor strip 3 are electrically connected to primary terminal members 4, 5 arranged at one side of the substrate 1.

The underside of the substrate 1 carries a secondary terminal member 6. The secondary terminal member is integrally formed with a cylindrical support shaft portion 7 fitted in the central bore 2 of the substrate 1 (see FIGS. 1 and 3).

The variable resistor further comprises a rotor RT which includes a generally circular main rotor member 8, a generally discal upper plate member 10, and a lower ring-form slide member 13. The rotor RT having these three members is formed of a punched thin metal plate which is initially in an expanded state (FIG. 6) and later folded by bending at first and second connecting webs 12, 14, respectively, between the three members 8, 10, 13 (see FIG. 7).

Figure 3:
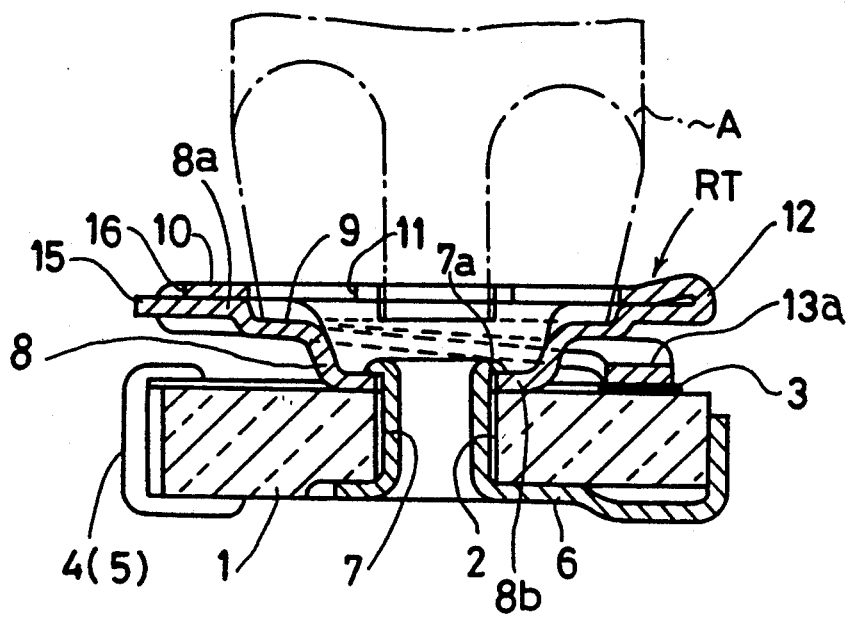
FIG. 3 is a sectional view taken along lines III—III in FIG. 1.
Figure 4:
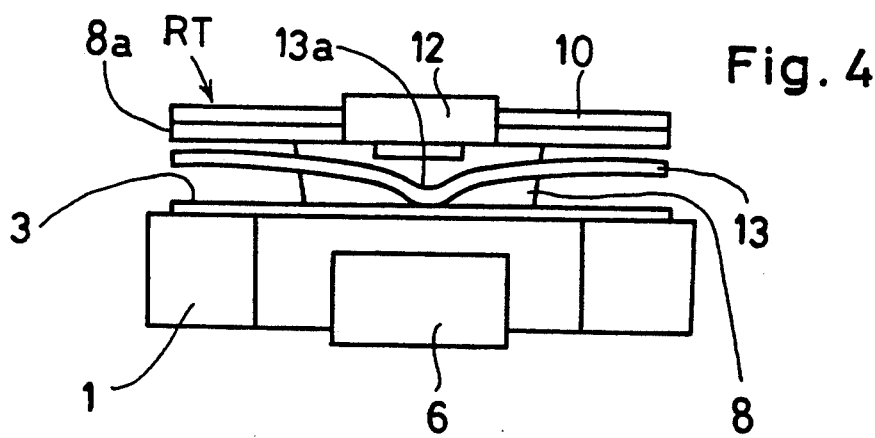
FIG. 4 is elevational view as seen in the direction of arrows IV—IV in FIG. 1.
Figure 5:
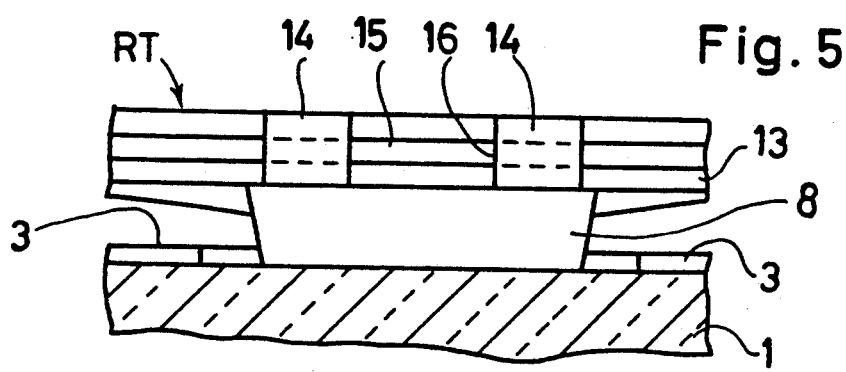
FIG. 5 is an elevational view as seen in the direction of arrows V—V in FIG. 1.

The main rotor member 8, which is centrally recessed in the form of a shallow cup or dish, has an outer flange portion 8a and an inner marginal portion 8b (FIG. 3). The inner marginal portion 8b is fitted around the shaft portion 7 of the secondary terminal member 6, and the shaft portion 7 is made to have an upper end 7a which is enlarged by crimping (plastic deformation) for slidable engagement with the inner marginal portion 8b. Thus, the rotor RT is rotatably supported by the shaft portion 7 of the secondary terminal member 6.

The outer flange portions 8a of the main rotor member 8 is formed with a plurality (four in the first embodiment) of engaging grooves 9 (FIGS. 1, 2 and 6) arranged equiangularly around the central cup recess. These engaging grooves are used for engaging a Phillips head driver A (FIG. 3) at the time of turning the rotor RT for resistance adjustment. Each of the engaging grooves 9 may be prepared by forming a pair of parallel cutting lines in the outer flange portion 8a and thereafter depressing, by a die, a portion between the pair of cutting lines.

Figure 6:
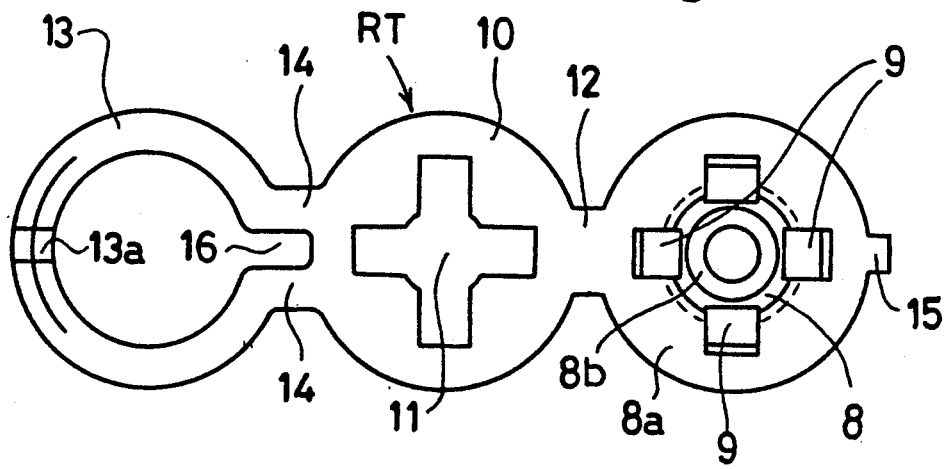
FIG. 6 is an expanded plan view showing the rotor of the same resistor.
Figure 7:
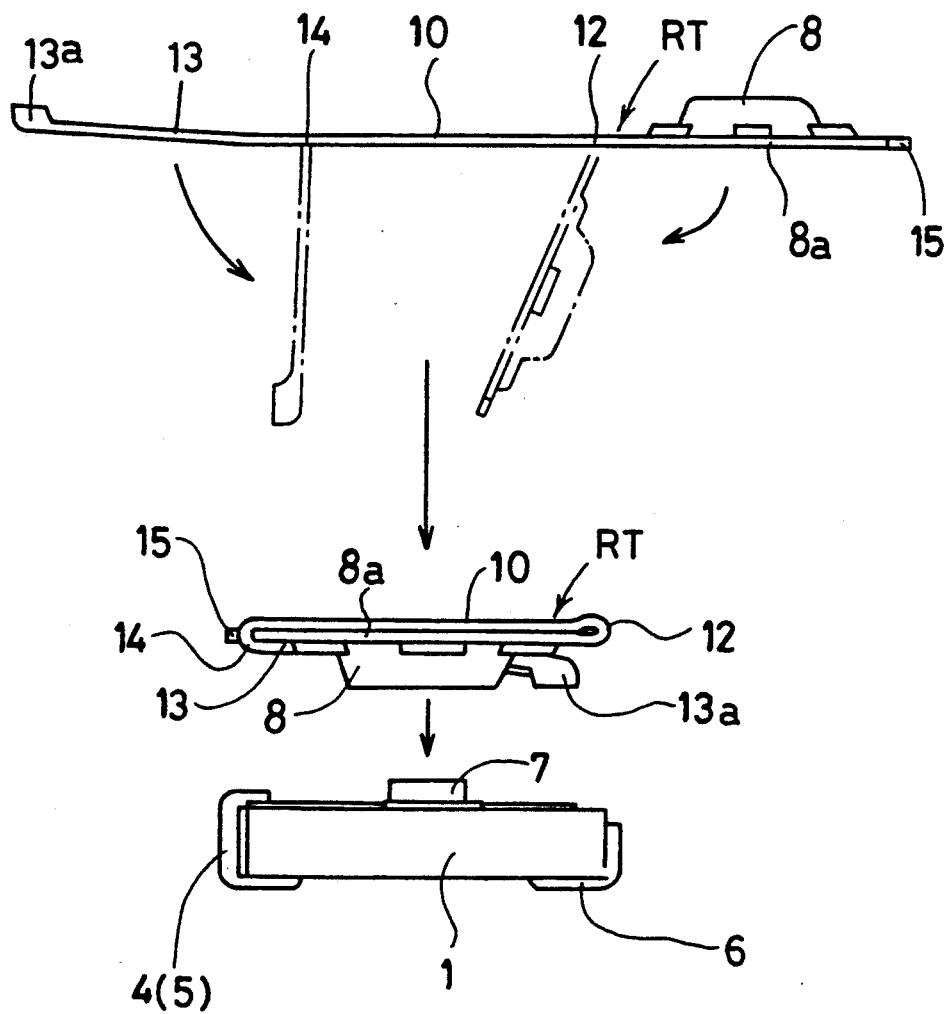
FIG. 7 is a side view showing the steps of assembling the same resistor.

The upper plate member 10 of the rotor RT is integral with the main rotor member 8 via the first connecting web 12 and rests on the outer flange portion 8a of the main rotor member 8 (see FIGS. 3, 6 and 7). The upper plate member 10 has an engaging opening 11 (see FIGS. 1 and 2) which, according to the first embodiment, has a configuration of the cross in corresponding relation to the engaging grooves 9 of the main rotor member 8 for engagement with the Phillips head driver A (FIG. 3).

The lower slide member 13 is formed integrally with the upper plate member 10 via the second connecting web 14 and made to fit around the cup recess portion of the main rotor member 8 from below when bent at the second connecting web 14. The slide member 13 has a downwardly projecting contact portion 13a at a position diametrically opposite to the second connecting web 14 for pressing contact with the resistor strip 3 under the elastic urging force of the slide member itself.

Figure 2:
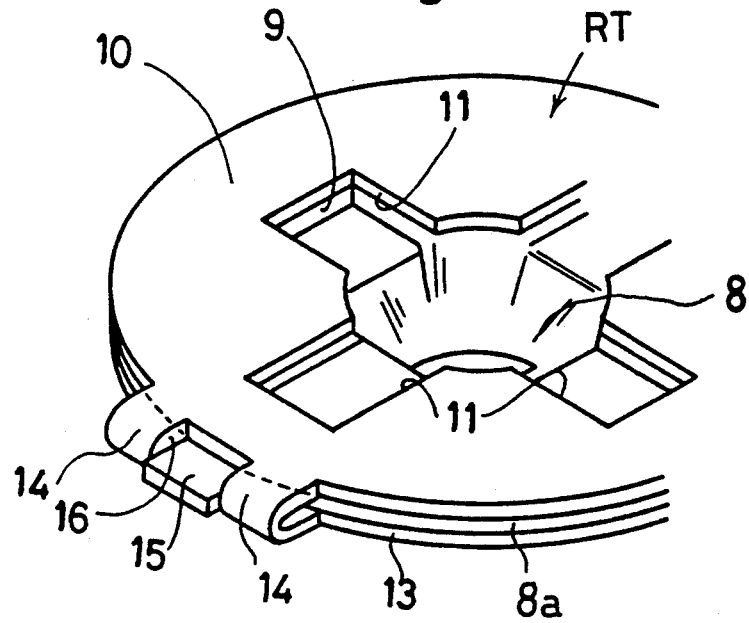
FIG. 2 is a perspective view showing a rotor of the same resistor.

Further, according to the first embodiment, the outer flange portion 8a of the main rotor member 8 is formed with an engaging projection 15 (FIG. 6) at a position diametrically opposite to the first connecting web 12, whereas the second connecting web 14 between the upper plate member 10 and the lower slide member 13 is formed with an engaging slot 16 (also FIG. 6). The engaging projection 15 engages the engaging slot 16 upon bending (FIG. 7) at the respective connecting webs 12, 14, as shown in FIGS. 1 and 2.

With the arrangement described above, the resistance of the variable resistor can be adjusted by turning the rotor RT on the shaft portion 7 of the secondary terminal member 6 to change the position of the contact portion 13a relative to the resistor strip 3. The adjusted resistance is given across one of the primary terminal members 4, 5 and the secondary terminal member 6.

The rotor RT can be turned by the driver A engageable with the cross opening 11 of the upper plate member 10 and the engaging grooves 9 of the main rotor member 8. If, at this time, the driver A engages only the cross opening 11 of the upper plate member 10, a force is generated which tends to rotate the upper plate member 10 relative to the main rotor member 8 which is frictional contact with the substrate 1. However, since the engaging slot 16 formed in the second connecting web 14 between the upper plate member 10 and the lower slide member 13 engages the engaging projection 15 of the main rotor member 8, the first connecting web 12 between the main rotor member 8 and the upper plate member 10 is prevented from being elastically deformed. Thus, the rotor RT as a whole can be stably turned by an intended amount (angle) even when the driver engages the rotor improperly (incompletely).

Figure 8:
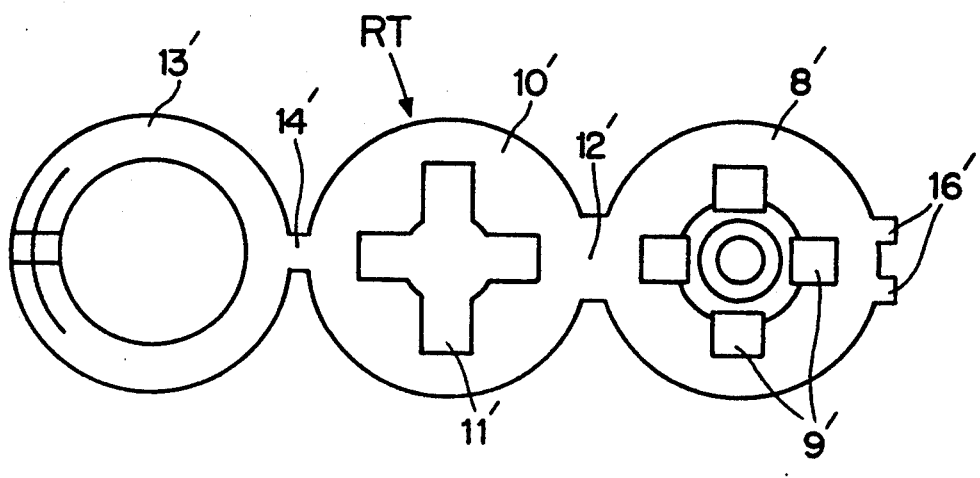
FIG. 8 is plan view showing a modified rotor to be incorporated into a variable resistor according to the present invention.
Figure 9:
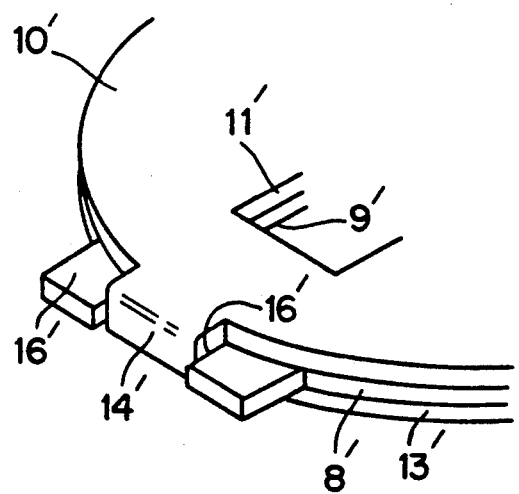
FIG. 9 is an expanded plan view showing the rotor of FIG. 8.

FIGS. 8 and 9 shown a variable resistor according to a second embodiment of the present invention. The resistor of this embodiment differs from that of the first embodiment only in the incorporation of a modified rotor RT'.

Specifically, as shown in FIG. 8, the modified rotor RT' comprises a main rotor member 8' having engaging grooves 9', an upper plate member 10' having a cross engaging opening 11' and integrally connected to the main rotor member 8' via a first connecting web 12', and a lower ring-form slide member 13' integrally connected to the upper plate member 10' via a second connecting web 14'. The main rotor member 8' is integrally formed with a pair of engaging projections 16'. The second connecting web 14' between the upper plate member 10' and the lower slide member 13' is somewhat slenderized to act as an engaging portion for snugly fitting between the pair of engaging projections 16' (see FIG. 9) when the rotor RT' is folded (cf. FIG. 7).

Obviously, since the engagement of the second connecting web 14' with the engaging projections 16' prevents the upper plate member 10' from angularly deviating relative to the main rotor member 8', the rotor RT' of the second embodiment enjoys 5 the same advantages as that of the first embodiment.

If necessary, the lower ring-form slide member 13, 13' of the rotor in either of the two embodiments may be omitted, and the main rotor member 8, 8' itself may be made to have a contact portion which comes into sliding contact with the resistor strip 3. However, the provision of the lower ring-form slide member 13, 13' is preferred firstly because the elasticity of the slide member can be utilized for preventing improper sliding contact relative to the resistor strip 3, and secondly because the second connecting web 14, 14' between the upper plate member 10, 10' and the lower ring-form slide member 13, 13' can be made to have an additional function of preventing an angular deviation of the upper plate member 10, 10' relative to the main rotor member 8, 8'.

The present invention being thus described, it is obvious that the same may be varied in many ways. For instance, the main rotor member 8, 8' may be made to have a shape other than the illustrated cup form. Such variations are not to be regarded as a departure from the spirit and scope of the invention, and all such modifications as would be obvious to those skilled in the art are intended to be included within the scope of the following claims.

What is claimed is:

1. A variable electronic component comprising:
   an insulating substrate; and
   a rotor made of a metal plate and rotatably supported on the substrate for parameter adjustment of the electronic component, the rotor including a main rotor member and an upper plate member integral with the main rotor member via a connecting web which is bent so that the upper plate member overlaps on the main rotor member, the upper plate member having an engaging opening for engagement with a turning tool;
   wherein the main rotor member is provided with a first engaging portion at a position spaced from the connecting web, the upper plate member being provided with a second engaging portion for engagement with the first engaging portion to prevent the upper plate member from angularly deviating relative to the main rotor member when the upper plate member is overlapped on the main rotor member.

2. The electronic component according to claim 1, wherein the main rotor member is generally circular, the first and second engaging portions being located diametrically opposite to the connecting web between the main rotor member and the upper plate member.

3. The electronic component according to claim 1, further comprising a lower ring-form slide member integral with the upper plate member via a second connecting web which is bent so that the slide member is located under the main rotor member.

4. The electronic component according to claim 3, wherein the first engaging portion comprises an engaging projection formed on the main rotor member, the second engaging portion comprising an engaging slot formed in the second connecting web for snugly receiving the engaging projection.

5. The electronic component according to claim 3, wherein the first engaging portion comprises a pair of engaging projections formed on the main rotor member, the second engaging portion being the second connecting web which snugly fits between the pair of engaging projections.

* * * * *